Dec. 19, 1967
F. CAMPS
3,358,655
COOLING DEVICE FOR LIQUID-COOLED
INTERNAL-COMBUSTION ENGINES
Filed June 7, 1966
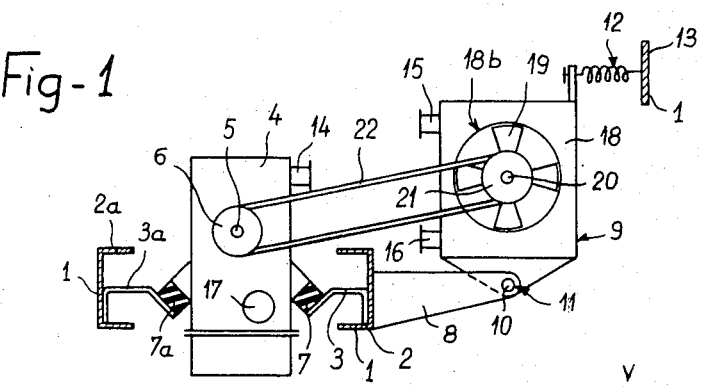
Fig-1
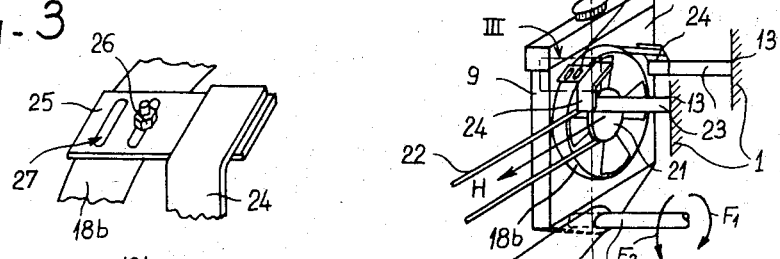
Fig-3
Fig-2
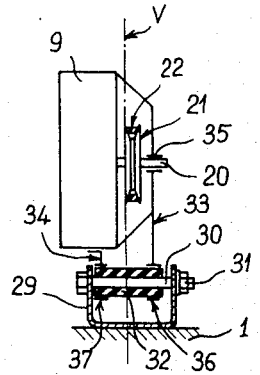
Fig-4
Fig-5
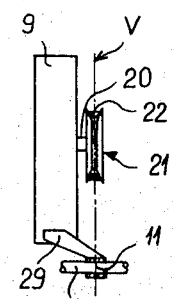
Fig-6

United States Patent Office 3,358,655
Patented Dec. 19, 1967

3,358,655
COOLING DEVICE FOR LIQUID-COOLED
INTERNAL-COMBUSTION ENGINES
Francois Camps, Lyon, France, assignor to Automobiles
M. Berliet, Lyon, France
Filed June 7, 1966, Ser. No. 555,874
Claims priority, application France, June 9, 1965,
20,111, Patent 1,448,129
8 Claims. (Cl. 123—41.15)

As is well known, an internal-combustion engine is frequently cooled by means of a liquid, by water for example, which is heated-up by the engine and is cooled in a radiator, in contact with air set in motion by a fan.

On automobile vehicles, for example, this fan is generally mounted on the engine and driven by the latter, together with a dynamo, by means of pulleys and a flexible belt, and in order to improve its efficiency, is often housed inside a sheet steel casing fixed to the radiator, the efficiency of the fan increasing as the clearance between the extremities of its blades and the steel casing is reduced, provided that other conditions remain unchanged. As the radiator is generally fixed elastically on the chassis or the body of the vehicle, the fan being mounted on the engine, the above-mentioned clearance must unfortunately be kept at a substantial value which means that the efficiency of this fan is not very good.

Another disadvantage of the usual cooling devices which becomes apparent during use, is the necessity of periodically adjusting the tension of the flexible belt which serves to drive the fan in rotation and which becomes slack in time, for example by moving the dynamo closer to or farther away from the longitudinal axis of the engine.

The present invention is intended to avoid the disadvantages referred to above.

It has for its object a cooling device employing liquid circulating in a closed circuit, for internal combustion engines or the like, mounted and fixed on a support which may be a fixed foundation base or the chassis of an automobile vehicle or the like, this cooling device being essentially characterized in that it is constituted by a unit comprising a radiator connected to the cooling circuit of the engine, together with a fan fixed to this radiator and comprising a fixed portion and a moving portion mounted on a shaft provided with a wheel driven in rotation by a flexible transmission drive, the said unit being coupled to the engine support by means of a fixing device comprising a pivotal member, the axis of which is parallel to the fan shaft, and at least one elastic element which restores the cooling unit to a position of equilibrium.

It will be understood that as the fan is fixed to the radiator and not to the chassis or to the body of an automobile vehicle for example, the clearance between the metal casing fixed to the radiator and the extremities of the fan blades can be reduced, thereby improving the efficiency of the fan. In addition, since the fixing device returns the cooling unit and in particular the pulley of the fan which is fixed to it, towards a position of equilibrium, the driving belt is kept at a suitable tension, and it is no longer necessary to adjust it periodically.

In order that the object of the invention may be better understood, there will now be described by way of illustration two of its forms of construction, given as examples and illustrated by the accompanying drawings.

In these drawings:

FIG. 1 is a diagrammatic view in elevation of one form of embodiment of the invention;

FIG. 2 shows a perspective view of one form of construction of an elastic fixing means for a cooling device according to the invention;

FIG. 3 is a perspective view to a larger scale of the detail III enclosed in chain-dotted lines in FIG. 2;

FIG. 4 is a view in elevation of an alternative form of construction of the elastic fixing means shown in FIG. 2;

FIG. 5 is a detail view of a pivotal mounting of a cooling device according to the invention; and FIG. 6 shows an alternative form of the construction of FIG. 1.

Referring now to FIG. 1 of the drawings, it can be seen that there is shown by the reference 1 a frame, a chassis of an automobile or other vehicle for example, and in particular of an industrial vehicle, this frame comprising longitudinal girders 2 and 2a, to which are rigidly fixed the supporting lugs 3 and 3a. An internal-combustion engine 4, provided with an auxiliary shaft 5 carrying a pulley 6 is elastically suspended from these supporting lugs by means of elastic blocks 7 and 7a, preferably of elastomer and working in shear for example.

The chassis 1 is also provided with a supporting arm 8 fixed rigidly to the longitudinal girder 2, on which support a liquid radiator 9 is pivotally mounted by means of a shaft 10 passing through an opening 11 which serves as a bearing, formed in the lower part of the said radiator. An elastic member 12, a spring for example, serves to attach the radiator 9 to the chassis 1 or to the body 13 of the vehicle.

A cooling liquid, generally consisting of water, passes out of the engine 4 through a nozzle 14, passes through the radiator by means of the nozzle 15 and 16 and returns to the engine through a nozzle 17. The piping systems coupling together the nozzles 14 and 15 on the one hand and the nozzles 16 and 17 on the other have not been shown in the drawing for the sake of clearness.

The radiator 9 is fitted with a sheet metal panel 18 having a collar 18b, in which is housed a fan 19 mounted on the radiator 9 by means of a shaft 20 fitted with a pulley or wheel 21. The auxiliary shaft 5 of the engine 4 drives the shaft 20 of the fan in rotation by means of the pulleys 6 and 21 and a flexible coupling belt 22.

As will be understood, the elastic member 12 applies a continuous tractive pull of predetermined value on the pivotally-mounted radiator 9, and especially on the pulley 21 which is fixed to it. As the belt 22 is continuously kept under a suitable tension, it is no longer necessary to re-adjust it periodically. In addition, as the fan 19 is formed in a unit with the radiator 9, contrary to the arrangement normally adopted, it is possible to provide a very small clearance between the collar 18b and the extremities of the blades of the fan 19, the efficiency of which is thereby improved.

In the case shown in FIG. 2, the elastic coupling between the radiator 9, pivotally mounted on the support 8 by means of the shaft 10, and a support 23 rigidly fixed to the chassis 1 or to the body 13, is effected by means of extensible and elastic strips 24 (FIGS. 2 and 3), of rubberized fabric for example, attached by one of their extremities to the support 23 and by the other extremity to a fixing lug 25. The extensible strips 24 are preferably provided in even numbers as shown in the drawing, two adjacent strips being arranged in opposite directions, and the lugs 25 are fixed to the radiator 9, to the collar 18b of its sheet metal casing 18 for example, by means of screws or bolts 26 (see FIG. 3).

To this end, elongated slots 27 have been formed in the lugs 25 which enable these lugs to be moved during assembly in order to put any suitable tension on the extensible strips 24. The radiator 9 is thereby returned towards a position of equilibrium when it tends to pivot about its axis 10 in one of the directions indicated by the arrows F1 and F2 under the action (arrow H of FIG. 2) of the belt 22 or under the influence of the vibrations and shocks caused by the engine 4, or by a vehicle on which it is mounted.

In FIG. 4, the longitudinal girder 2, the support 8, the radiator 9 and its pivotal shaft 10, the sheet metal casing 18 and its collar 18b, the fan 19, the pulley 21 and its driivng belt 22 mounted on the shaft 20 of the said fan, are identical with or very similar to those shown in FIG. 1, but the elastic coupling between the radiator 9 and the chassis 1 is effected by means of an elastic cushion 28, preferably of elastomer, interposed between the chassis 1, 2 and this radiator, and put under compression by the belt 22. The tractive force applied by this belt on the pulley 21 tends to fact to cause the radiator 9 to pivot in the direction indicated by the arrow F2.

This tractive pull has also the effect of creating a couple tending to cause the radiator 9 to pivot in the direction indicated by an arrow G (FIG. 2) around the vertical axis V passing through the geometric centre of the bearing 11.

In the case of FIG. 5, this vertical axis V is contained in the central plane of the pulley 21, which drives the fan 19, a lug 29 in which is formed the orifice 11 serving as a bearing extending the radiator 9 rearwards.

In consequence, the couple acting in the direction of the arrow G (see FIG. 2) is very small or zero, and it is possible to mount the shaft 10 on an elastic bearing (not shown) or to form the shaft 10 by an elastic member without the radiator 9 being liable to pivot in an undesirable manner about the vertical axis V and thus forcing the pulley 21 out of line with respect to the pulley 6.

In the form of embodiment of the invention shown in FIG. 6, a frame 1, a chassis of an automobile or other vehicle for example, and in particular of an industrial vehicle, comprises at least one steel section 29, on which is fixed a rod 30, which may be a bolt stem provided with a nut 31. An elastic sleeve 32, of elastomer for example, surrounds the rod 30 and is fixed thereto preferably by adhesion of the elastomer to the metal.

The radiator 9 is provided with two supports 33 and 34, one of which comprises two sockets 35 and 36 and the other a single socket 37. In the socket 35 which serves the purpose of the bearing, rotates the shaft 20 of the fan fitted with its pulley 21 which is driven by the flexible belt 22. The sockets 36 and 37 are fixed to the elastic sleeve 32 which passes through them and the vertical axis V taken through the geometric centre of the unit constituted by these two sockets passes practically in the central plane of the pulley 22.

As will be understood, the radiator 9 can on the one hand pivot about the rod 30 and on the other hand it is restored to a position of equilibrium by the elastic sleeve 32 which furthermore ensures that the belt 22 is maintained under a suitable tension.

Finally, the reactions at the supporting points of the two support-sockets 36 and 37 on the elastic cylinder 32 are small and are insufficient to throw the pulleys 6 and 21 out of alignment, the couple acting in the direction of the arrow G on the radiator 9 being practically zero, as mentioned above, and the two support-sockets 36 and 37 fixed to the two extremities of the cylinder 32 being distant from each other.

It will of course be understood that the forms of embodiment described above are not limitative and may be given any desired modifications without thereby departing from the scope of the invention.

What is claimed is:
1. A cooling device for internal combustion engines or the like, cooled by means of a liquid circulating in a closed circuit, the said engine resting on a support which may be a fixed foundation base or a chassis of an automobile or like vehicle, the said cooling device being characterized in that it is constituted by a unit comprising a radiator coupled to the liquid circuit which serves to cool the engine, together with a fan fixed to the said radiator and comprising a fixed portion and a rotating portion mounted on a shaft provided with a wheel driven in rotation by a flexible transmission, the said unit being fixed to the engine support by means of a coupling device comprising a pivotal member having its shaft parallel to the shaft of the fan, and at least one elastic member adapted to restore the cooling unit to a position of equilibrium.

2. A cooling device in accordance with claim 1, in which the said coupling device comprises a pivot and a spring coupling the said cooling unit elastically to the engine support.

3. A cooling device in accordance with claim 1, in which the said coupling device comprises extensible elastic strips fixed by one of their extremities to the engine support and by the other extremity to a fixing lug coupled to the said cooling unit, the tension of the said strips being adjustable by means of sliding fixing means.

4. A cooling device in accordance with claim 3, in which the said extensible elastic strips are divided into two groups, two strips belonging to different groups being arranged in opposite directions.

5. A cooling device in accordance with claim 1, in which the fixing device comprises an elastic cushion inserted between the said cooling unit and the engine and put under compression by the said flexible transmission which serves to drive the fan in rotation.

6. A cooling device in accordance with claim 1, in which the plane containing the geometrical centre of the pivotal device and perpendicular to the axis of said latter device passes at a short distance, with respect to the length of the pivotal member, from the central plane of the wheel serving to drive the said fan in rotation.

7. A cooling device in accordance with claim 1, in which the said cooling unit is fixed to the two extremities of an elastic member for the deformations due to a torsion having its axis parallel to the shaft of the fan, the said member coupling the said unit to the engine support.

8. A cooling device in accordance with claim 7, in which the said elastic member comprises an elastic sleeve fixed to the engine support and to the said cooling unit by the extremities of the said sleeve.

References Cited
UNITED STATES PATENTS
2,590,134 3/1952 Slonneger _____ 123—41.15
2,612,881 10/1952 Slonneger _____ 123—41.15

AL LAWRENCE SMITH, *Primary Examiner.*